INVENTORS
WALLACE R. RHINE
JOHN J. GREVICH
BY
Williamson & Palmatier
ATTORNEYS

Feb. 3, 1970 W. R. RHINE ETAL 3,492,775
BAGGING
Filed Nov. 22, 1965 5 Sheets-Sheet 2

INVENTORS
WALLACE R. RHINE
JOHN J. GREVICH
BY
Williamson & Palmatier
ATTORNEYS

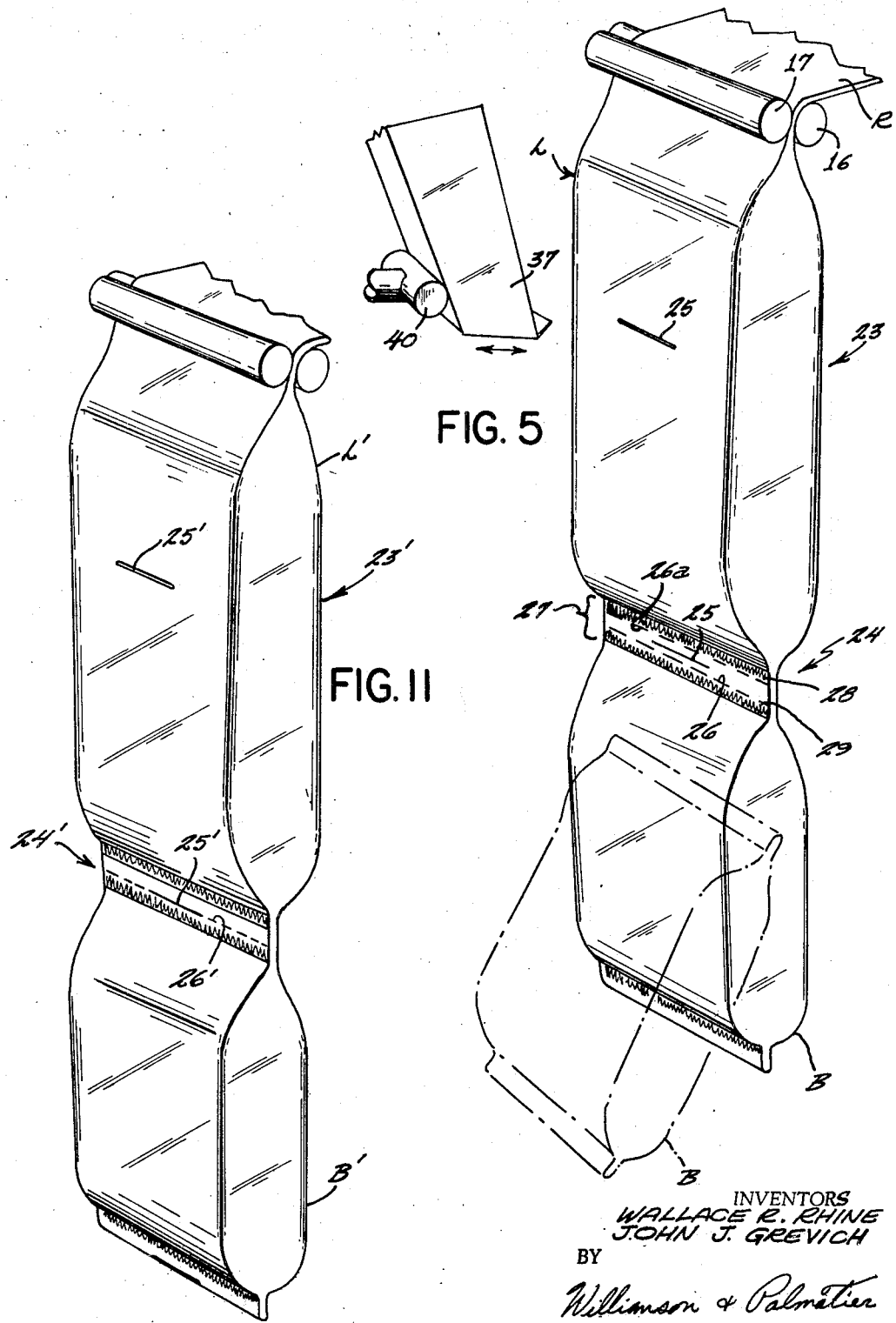

Feb. 3, 1970  W. R. RHINE ETAL  3,492,775
BAGGING

Filed Nov. 22, 1965  5 Sheets-Sheet 4

INVENTORS
WALLACE R. RHINE
JOHN J. GREVICH
BY
Williamson & Palmatier
ATTORNEYS

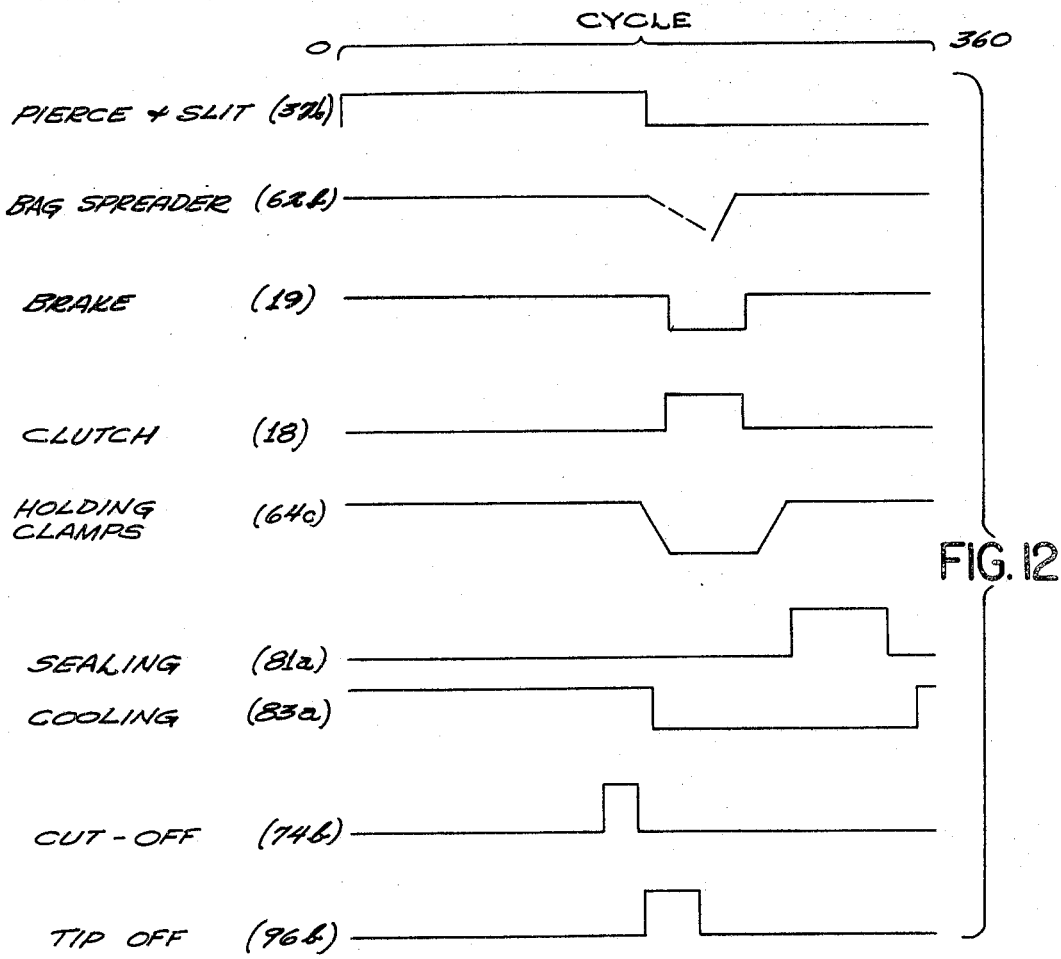
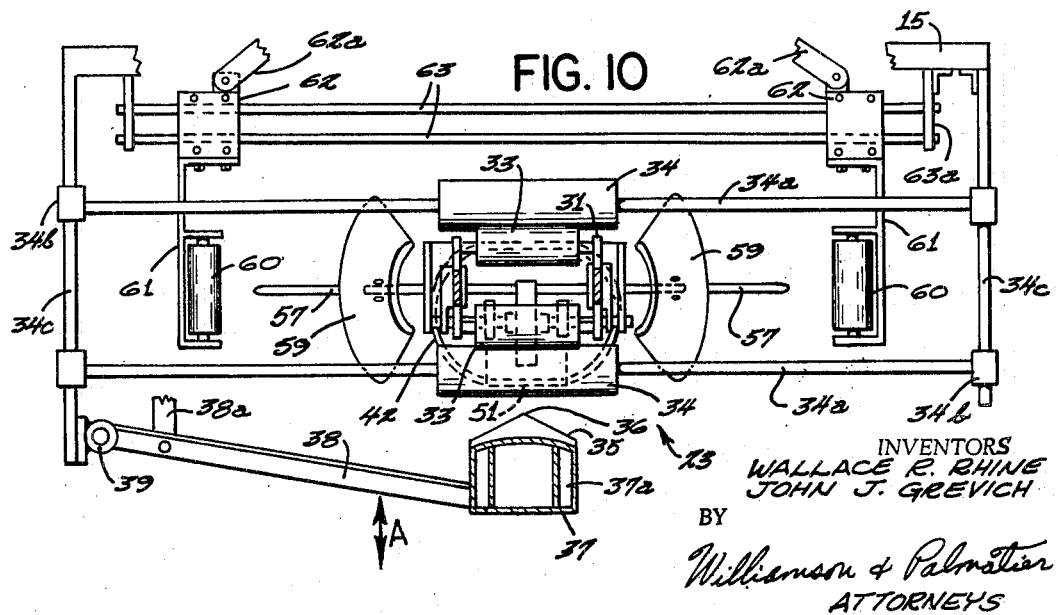

3,492,775
BAGGING
Wallace R. Rhine, New Richmond, and John J. Grevich, Star Prairie, Wis., assignors to Doughboy Industries, Inc., New Richmond, Wis., a corporation of Wisconsin
Filed Nov. 22, 1965, Ser. No. 510,149
Int. Cl. B65b 9/14, 39/00, 61/06
U.S. Cl. 53—29          8 Claims

ABSTRACT OF THE DISCLOSURE

Bag forming and filling apparatus moving a tubular ribbon of bag material to a first position wherein the material is slit and filled, and a second position wherein the bag is sealed, closed and severed and wherein the bottom of the next bag is formed.

---

In the production of heat sealable film material such as polyethylene commonly employed in bag type container, the film material is conventionally extruded in the form of a tubular ribbon which, after having been extruded is flattened and wound in rolls. In order to minimize handling of the film material, it has been found possible in the production of bags to be utilized for certain purposes, to produce the bags directly from the tubular stock and to essentially simultaneously fill the bags thus produced.

It is an object of the invention to provide a new and novel method of making, filling and closing bags from a tubular ribbon of pliable sheet material with a minimum of handling of the material and bags during the operation.

Another object of the invention is the provision of an improved method of making, filling and closing bags of tubular pliable sheet material wherein the tubular ribbon of material is moved to a first station at which the tubular ribbon is distended to the desired shape of the bag, it is subsequently pierced and cut to facilitate filling of the ribbon with flowable material, and the tubular ribbon of material is subsequently moved to a second station at which the tubular material is pinched together and secured and then cut entirely across at essentially the same location at which the ribbon had been previously pierced and cut for filling purposes, so that in a continuing operation the tubular ribbon of pliable sheet material is formed into a bag, filled and sealed shut without requiring any manual manipulation of the bag or of the tubular ribbon of material, while keeping the wastage of the sheet material to an absolute minimum.

Another object of the invention is the provision of new and novel apparatus for spreading the pliable sheet material in a tubular ribbon into distended condition to facilitate piercing of the sheet material and filling of a closed end of the tubular ribbon with the flowable material.

Still another object of the invention is the provision of improved apparatus for manipulating a ribbon of pliable sheet material in such a manner as to permit filling of the ribbon with a flowable material and subsequently facilitating the closing of a portion of the tubular so as to encapsulate a predetermined quantity of the flowable material and thereby facilitate production of a bag filled with such flowable material.

These and other objects and advantages of the invention will more fully appear from the following description made in connection with the accompanying drawings, wherein like reference characters refer to the same or similar parts throughout the several views, and in which:

FIG. 5 is a diagrammatic perspective view illustrating the forming of bags according to the present invention.

FIG. 10 is a detail section view taken approximately at 10—10 in FIG. 7 and showing portions of the apparatus broken away for clarity of detail.

FIG. 11 is a view similar to FIG. 5 and illustrating a modified form of the bagging operation.

FIG. 12 is a schematic diagram illustrating the timing of the various operations during a cycle of machine operation.

Figure 1:
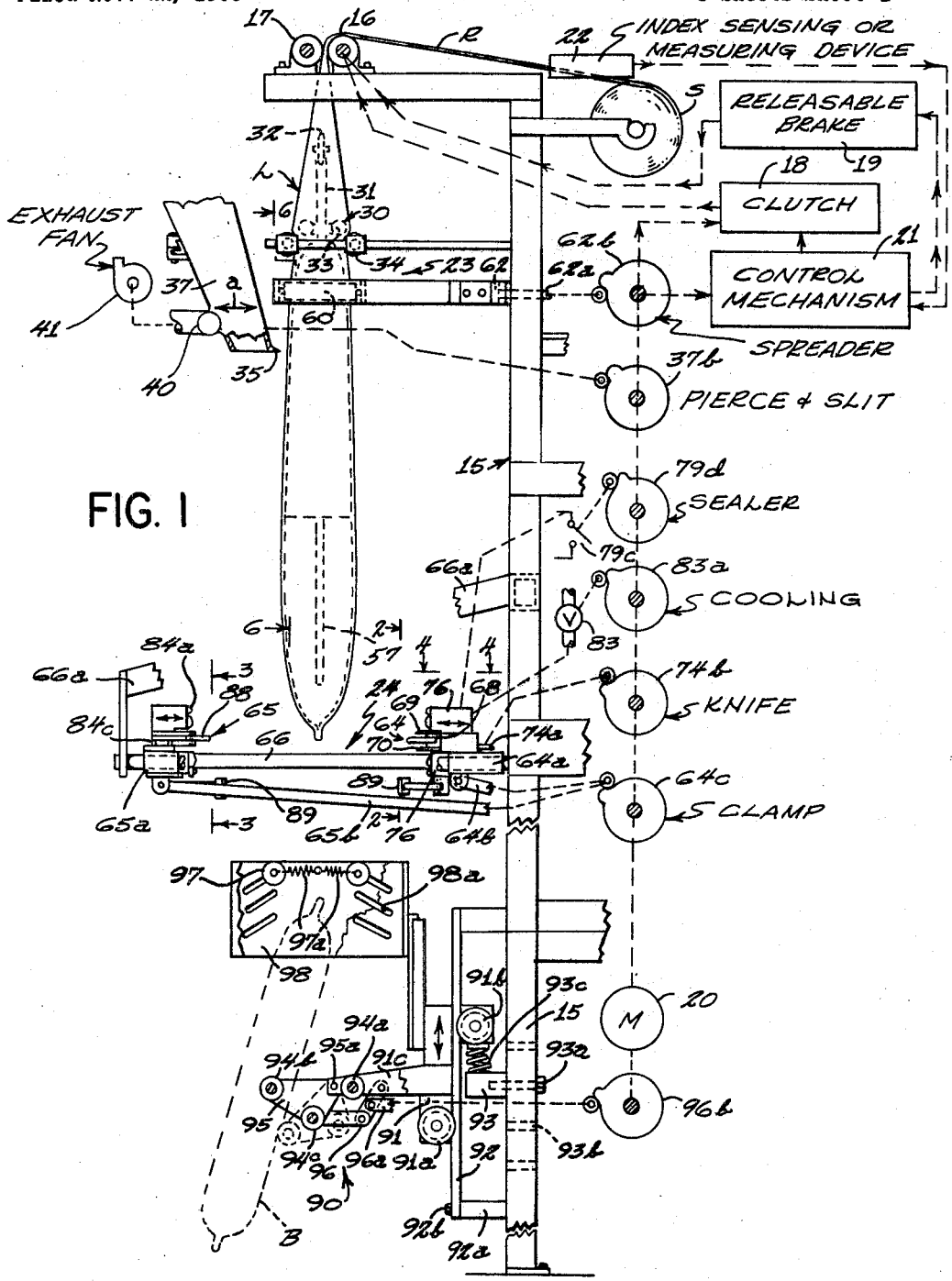
FIG. 1 is an elevation view, partly shown in section illustrating the formation and filling of bag from the tubular ribbon of pliable sheet material, and also illustrating the sequencing and operating cams diagrammatically.
Figure 2:
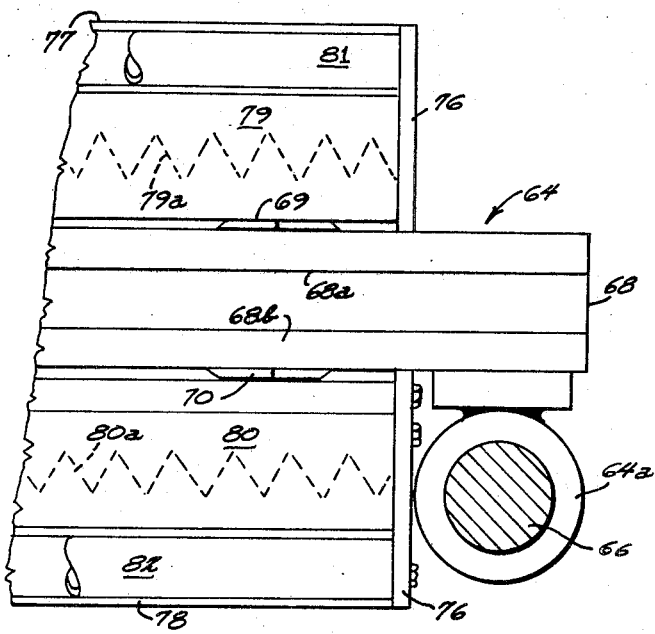
FIG. 2 is an enlarged detail section view taken approximately at 2—2 in FIG. 1.
Figure 4:
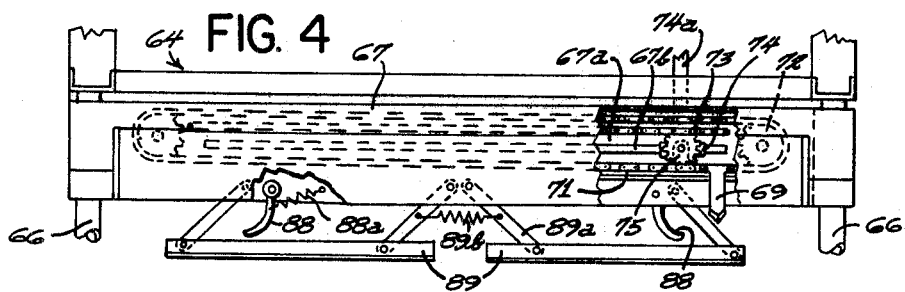
FIG. 4 is a detail section view, partly broken away for clarity of detail, and being taken at approximately 4—4 in FIG. 1.
Figure 3:
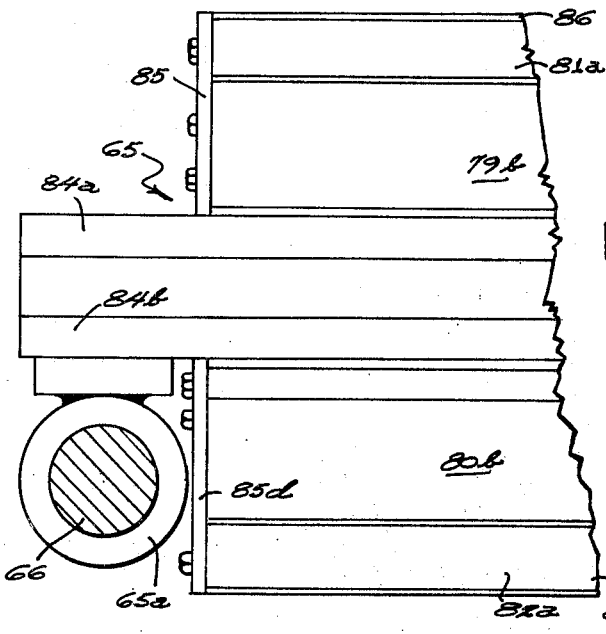
FIG. 3 is an enlarged detail section view taken approximately at 3—3 in FIG. 1.

The apparatus has a generally upright frame, indicated in general by numeral 15 arranged so that a length L of the tubular ribbon or tubular extruded film material may be suspended from an elevated position and thereby hang in depending condition during the bag forming and filling operations. The tubular ribbon R of film material is supplied to a pair of cooperating rollers 16 and 17 spaced sufficiently close together as to grip the ribbon of tubular film material which passes therebetween. The roller 17 positively holds the ribbon of film material against the roller 16 which is controlled by means of a clutch 18 and a releasable brake 19. Rotary power is supplied to the roller 16 and through the clutch when engaged, from a motor 20. The ribbon R of film material is supplied from a suitable spool S which is rotatably supported from a portion of the frame 15.

Operation of the clutch 18 and the releasable brake 19 is controlled by a control mechanism 21 which responds to an index sensing or measuring device 22 which senses index marks on the ribbon R of film material which are regularly spaced from each other along the length of the ribbon and which control the lengths of the bags being produced. Alternatively, the device 22 may actually measure the length of ribbon R being paid off the spool S so as to operate the brake and clutch whenever a desired length of the ribbon is measured. At a predetermined stage of the operational cycle, the brake 19 is released and the clutch 18 is engaged so as to cause roller 16 to draw the ribbon off the spool. When the sensing device 22 senses that a sufficient length of ribbon has been drawn, the control mechanism 21 will release the clutch 18 and set the brake 19 as to stop the ribbon.

In the forming and filling of bags, the length L of ribbon is sequentially acted upon at a first station, indicated in general by numeral 23 and at a second station, indicated in general by numeral 24.

At the first station 23, the length L of tubular film material is distended from the generally flattened condition of the ribbon R as it comes off the spool S and over the roller 16 and to the general oblong cross-sectional shape of a bag of granular or other type of flowable material. At the first station 23, the length L of tubular film material is also pierced and slit, in a transverse direction, at one side, as indicated in FIG. 5 at 24.

At the station 24, the length L of tubular film material is sequentially flattened and clamped into closed condition adjacent one of the slits 25 which has previously moved downwardly to the station 24. At locations above and below the slit in the film material, the film is permanently closed as by heat sealing so as to complete the formation and sealing of a bag B of the flowable granular material at a position below the station 24. The length L of film material need merely be severed at 26 to detach the bag B, which is completely ready for final handling and shipment.

While the length L of tubular film material is being clamped and sealed at the second station 24, the slit 25 at station 23 is opened as to provide access into the interior of the length L of film, and a quantity of the flowable or granular material is supplied through the opened slit 25 and into the portion of the tubular film above the station 24. The clamping which is simultaneously being effected at the station 24 tends to support at least a portion of the weight of the granular material supplied into the film. Simultaneously with the supplying of the flowable material through the slit 25, air is withdrawn by suction from the space within the tubular film material which is then being occupied by the flowable material being supplied.

Also at the station 23, the interior surface of the length L of film is shielded against dust from the flowable or granular material being supplied so as to minimize the adverse effects of such dust in the heat sealing which is subsequently carried out at station 24 and also as to minimize the adverse effect of such dust on operating mechanisms within the length L of tubular film as hereinafter described.

The clamping at the second station 24 is across a broad zone 27 of the film material and preferably as illustrated in FIG. 5, the film is heat sealed at a pair of separate bands 28 and 29 within the zone. The band of heat sealing 29 defines the top closure of the bag B already formed, and the band of heat sealing 28 forms the bottom closure of another bag being formed and upon which the weight of the flowable or granular material is supported. Although it is only necessary to sever the length L of film at the station 24 in one location, as at 26, it has been found that the bags ultimately produced are substantially neater and more commercially acceptable when the film is severed at two different locations within the zone 27, as at 26 and as at 26a which are respectively disposed below and above the slit 25.

In the slightly modified form of bag formation and filling illustrated in FIG. 11, the length L' of tubular film material is acted on at the station 23' in a manner identical to that hereinbefore described in connection with FIG. 5. At station 24' the length L' of bag material is acted on in a manner substantially identical to that previously described in connection with FIG. 5, with the exception that the severing of the bag B', effected at 26' is along a line, collinearly related to the slit 25' so that the severing at 26' really only constitutes an extending of the slit 25'.

At the station 23, a tubular ribbon distending apparatus 30 is disposed and maintained within the length L of tubular film, and includes a generally upright frame 31 mounting a pair of spreader and centering rollers 32 spaced from each other and first engaging the side edge portions of the film material as the film moves downwardly from the rollers 16 and 17.

A pair of elongate rollers 33 are spaced from each other in juxtaposed relation to engage and spread the broad front and rear faces or panels of the film material from each other. The rollers 33 also support the apparatus 30 and frame 31 to which the rollers 33 are journalled. Supporting the rollers 33 are a pair of rollers 34 spaced from each other in parallel relation and journalled upon stationary support bars 34a affixed as by brackets 34b at opposite ends to rigid arms 34c projecting forwardly from the frame 15. The center to center spacing between rollers 34 is slightly greater than the center line spacing of rollers 33, but the space between rollers 34 will not permit passage of the rollers 33 downwardly therebetween. The film material passes downwardly between the rollers 33 and 34 so that the rollers 34 support and cradle the rollers 33 and thereby support the film distending apparatus 30 at station 23.

At station 23 the slit 25 in the film material is produced by initially piercing the film and then cutting transversely of the length L of tubular film. In the form of apparatus disclosed the slit 25 is produced by a sharp edged blade 35 having a film piercing point 36. The blade 35 is affixed to the lower discharge end of a filling spout 37 which is mounted for oscillatory movement as indicated by arrow a toward and away from the length L of tubular film and in the form shown is swingably mounted upon a rigid arm 38 which is pivoted by a hinge 39 to the frame arm 34c. An operating arm 38a is pivotally connected to the rigid arm 38 to effect movement of the spout 37 into and out of film piercing and filling relation. The filling spout 37 has a compartmented wall structure defining air conduits 37a having open lower ends and also connected by a manifold and air conduit 40 to an exhaust fan 41, whereby to suck the air out of the length L of tubular film when the flowable or granular material is being supplied into the length of tubular film.

The operating arm 38a is controlled by a cam 37b which is driven by the motor 20 to swing the spout 37, producing slitting and filling of the length of tubular film in proper sequence in relation to the remainder of functions accomplished in the operational cycle. Predetermined quantities of flowable or granular material are supplied to and through the spout 37 when the spout is inserted into the length of tubular film in filling position.

Figure 9:
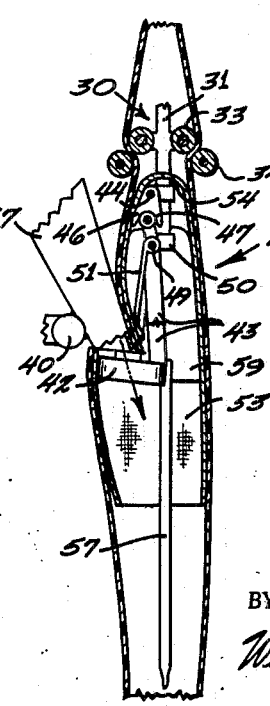
FIG. 9 is a detail section view to FIG. 8, but illustrating the apparatus in filling position.

The distending apparatus 30 also includes means producing a bulge immediately below the slit 25 when the spout 37 is moved into filling position. Such means includes a rigid ring or sleeve 42 disposed within the tubular film material immediately below the open lower end of the spout 37. The rigid ring 42 is mounted on a pair of upstanding rigid arms 43, the upper ends of which are affixed to a shaft 44 which is swingably mounted in bearing apertures in mounting ears 45 affixed to the upright frame 31. A forked cam 46 is also affixed to the shaft 44, as by welding, in depending relation. A cam-operating roller 47 is disposed in the bifurcated lower end portion of the cam 46 and is mounted upon a pair of upstanding operating arms 48, the lower ends of which are affixed as by welding to a shaft 49 rotatably mounted in bearing apertures in ears 50 affixed on the frame 31. The shaft 49 also mounts a depending swingable plate 51 which lies substantially parallel to and slightly inwardly of one side of the tubular film material and opposite the filling spout 37 so as to be engaged and moved inwardly when the filling spout 37 moves inwardly against the tubular film material during the film-piercing, severing, and filling operation. As seen in FIG. 9, inward swinging of the lower end of plate 51 swings the roller 47 forwardly which causes the cam 46 to swing in a similar direction so as to slightly rock the shaft 44 which swings the ring or sleeve 42 forwardly, thereby bulging the tubular film material immediately below the slit 25 while the filling spout 37 moves the portion of the film inwardly at a location just above the slit.

A torsion spring 52 may be provided on shaft 44 with its opposite ends anchored against the frame 31 and the cam 46 so as to return the shaft 44 to its normal position wherein the ring 42 is swung inwardly and out of film-bulging position.

Figure 6:
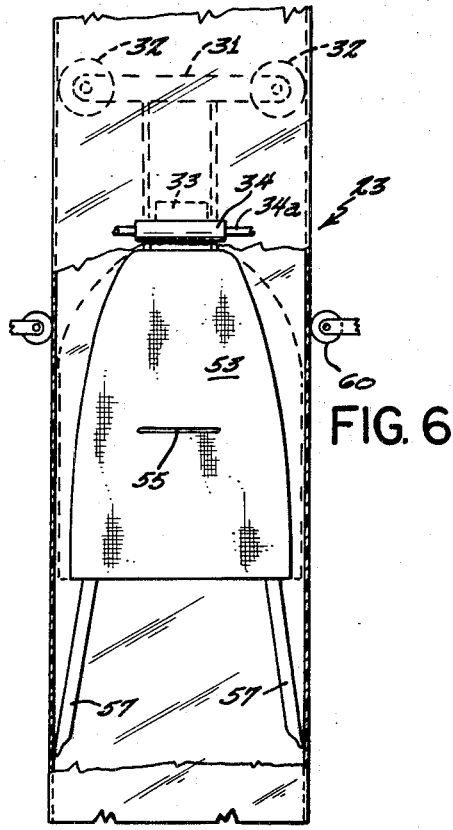
FIG. 6 is a detail section view taken approximately at 6—6 in FIG. 1.
Figure 7:
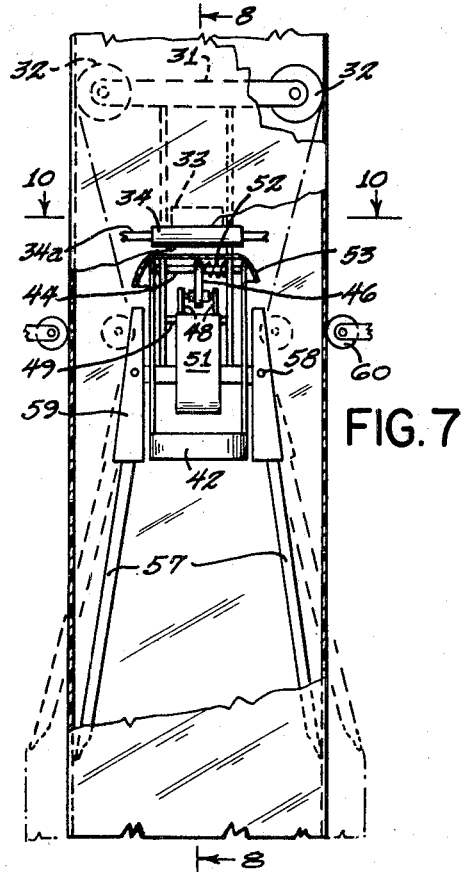
FIG. 7 is a detail section view similar to FIG. 6 and having additional portions broken away for illustration of detail.
Figure 8:
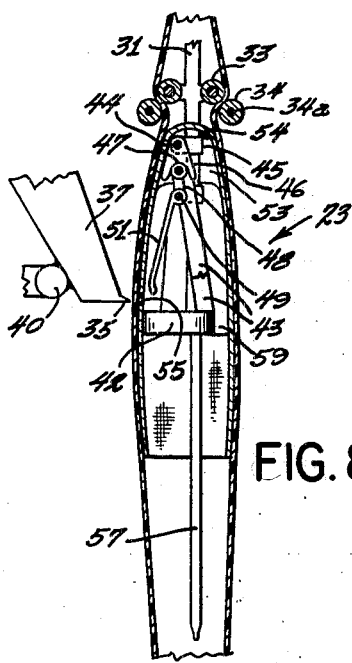
FIG. 8 is a detail section view taken approximately at 8—8 in FIG. 7.

At the first station 23, a fabric skirt 53 is also mounted on the frame 31 and is suspended below the rollers 33 so as to entirely encompass the film bulging sleeve 42 and its operating mechanism. The skirt 53 is mounted on a rigid cross bar 54 on the frame; and the skirt 53 has sufficient fullness so that throughout most of its length, the skirt may engage and shield the entire inner periphery of the length of tubular film material at the distending and filling station 23, substantially as seen in dotted lines in FIG. 6. The skirt 53 has a slit 55 therein disposed immediately opposite the sharp edged blade 35 on the spout 37 so as to receive this blade and permit filling of the tubular film material through the slit 55. It will be noted that when the spout 37 is moved inwardly as in FIG. 9, the skirt 53 is manipulated identically with the film material by the spout 37 and the bulging ring 42. It will be understood that although the skirt 53 hangs slack during certain portions of the operating cycle, the skirt will be distended against the inner periphery of the tubular film during the filling operation, particularly by the effect of the air in the tubular film which is being replaced by the flowable or granular material being supplied and which is being withdrawn by the exhaust ducts and fan 41.

A pair of swingable tubular film spreading and flattening member or arms 57 are mounted by pivots 58 to the bottom cross bar of frame 31 so as to swing outwardly against the inner side edges of the tubular film material so as to flatten the tubular film adjacent the station 24 into substantially the shape of the ribbon of film as the ribbon passes over roller 16. The flattening of the tubular film at station 24 permits closing by clamping the film without producing any wrinkles in the film.

The arms 57 have rounded film-guiding and operating plates 59 affixed thereto and swingable therewith. A pair of operating rollers 60, carried by brackets 61 are supported by slides 62 which may move along guide rods 63 affixed at opposite ends by frame elements 63a which are affixed to the frame 15. Each of the slides 62 has an operating arm 62a which are connected to and controlled by a cam 62b driven by the motor 20 so as to cycle the movement of the rollers 60 against the operating plates 59 for swinging the film spreading arms 57 outwardly at the proper time in relation to the operating cycle of the machine as a whole. It will be understood that the rollers 60 bear against the operating plates 59 through the film material, and the rollers effectively roll along the film as the film moves downwardly while in engagement with these rollers 60.

At station 24 a pair of elongate slides 64 and 65 are movable toward and away from each other and are provided with slide bearings 64a and 65a respectively which are slidably mounted on stationary rods 66 which extend forwardly from the upright frame 15 and are braced at their outer ends by brackets 66a.

The slides 64 and 65 are both movable toward and away from each other along the bars 66 and through substantial equal distances as to clamp the tubular film material therebetween. The slides 64 and 65 have linkages 64b and 65b respectively pivotally connected thereto and operated by cam 64c so as to effect movement of the slides 64 and 65 toward and away from each other at proper times in relation to the other portions of the operational cycle. Slide 64 includes a rigid housing 67 extending substantially throughout the entire length of the slide. A rigid channel 68 is affixed at the front side of the housing 67 and defines a pair of film-clamping edge portions 68a and 68b. A pair of rapidly movable knife blades 69 and 70 are disposed immediately above and below respectively, the channel 68 and project outwardly from slots in the wall of the housing 67. The knife blades 69 and 70 are affixed to an endless chain 71 disposed within the interior of housing 67 and extending substantially throughout its length and trained about sprockets 72. Another length 73 of chain is affixed within the housing 67 adjacent the continuous chain 71. The bottom plate 67a of the housing has a slot 67b providing a track for a slide 74 upon which a rotary sprocket 75 is journalled. The sprocket 75 is meshed with the length 73 of stationary chain and is also meshed with the continuous chain 71.

An operating bar 74a is affixed to the slide 74 and effects movement of the slide 74 and sprocket 75 longitudinally within the housing. The rolling of the sprocket 75 along chain 73 produces an eccelerated movement of the chain 71 and of the knives 69 and 70. The operating bar 74a is connected to and operated by a rotary cam 74b which is driven from the motor 20 to thereby effect operation of the knives 69 and 70 to sever the film material at the proper moment during the operational cycle. Rigid end plates 76 are affixed to the housing 67 at the opposite ends thereof and project upwardly and downwardly therefrom. Mounting brackets 77 and 78 extend therebetween above and below the knife blades 69 and 70 and the clamping bars 68a and 68b. The mounting brackets carry heat sealing bars 79 and 80, to engage and effect sealing of the tubular film material. It will be understood that the sealing bars 79 and 80 have resistance heaters 79a and 80a which may be controlled by a control switch 79c, operation of which is effected by a cam 79d connected to the motor 20 as to effect heating and sealing at the proper time in the operational cycle. The brackets 77 and 78 also mount cooling tubes 81 and 82 which carry film cooling fluid such as chilled water for cooling the film material immediately after application of sealing heat thereto, in order to set up the plastic material and cause strengthening thereof to produce a permanent closure at the ends of the bags B produced. The cooling tubes 81 and 82 are connected to an operating valve 83 which is operated and controlled by a cam 83a connected with the motor 20 for operating the valve 83 at the proper time in each operational cycle so as to effect the proper cooling of the film material after the heat sealing is effected.

The slide 65 includes a pair of rigid plates or bars 84a and 84b spaced slightly from each other and disposed in confronting relation with the clamping portions 68a and 68b respectively of the channel 68 on slide 64. The clamping bars 84a and 84b are affixed as by welding to spacers 83c so as to be maintained in predetermined relation with each other. Upright end plates 85 are affixed to the clamping bars 84a and 84b adjacent opposite ends thereof and have mounting brackets 86 and 87 thereon. The mounting brackets 86 and 87 have strips of substantially rigid, extremely slippery, and heat resisting plastic material 79b and 80b disposed opposite the sealing bars 79 and 80 of slide 64 so as to provide an anvil for each of the sealing bars when the slides are moved toward each other into engaging and sealing relation with respect to the plastic film material of the depending length L.

Each of the brackets 86 and 87 also carries a resiliently compressible clamping bar or bumper 81a and 82a respectively, for cooperating with the cooling tubes 81 and 82 of the slide 64 in clamping the polyethylene film material therebetween and cooling the sealed area.

Each of the slides 64 and 65 has a pair of film engaging and tensioning levers 88 which are pivotally mounted on the clamping bars 84a and 84b, and 68a and 68b. It will be noted that each of the levers 88 is convexly curved toward the outer ends of the slides 64 and 65. Springs 88a are provided for returning the levers to their illustrated position. The levers engage the tubular film material in the zone 27 (see FIG. 5) so as to stretch the film material and thereby smooth it so that wrinkles are eliminated from the sealed area.

Each of the slides 64 and 65 is also provided with a pair of movable bumper bars 89, each pivotally mounted by a pair of swingable arms 89a each of which is pivoted to the respective mounting brackets 87 and 78 of the slides 65 and 64 respectively. Springs 89b are connected to the mounting links 89a of adjoining bumper bars 89 for returning the bars to their outwardly swung positions as illustrated. The bumper bars engage the tubular film material as the slides 64 and 65 move toward each other, and the bumper bars 89 effect squeezing of the tubular film material and cause expulsion of air from the upper portion of the bag B immediately below the zone 27. A bag shipping and supporting apparatus 90 is adjustably mounted on the frame 15 below the slides 64 and 65, and is provided with a sliding support structure 91 which is movable upwardly and downwardly with respect to the frame 15. The support structure includes a plurality of flanged wheels 91a and 91b journalled on the support structure and engaging a track 92 affixed as by posts 92a and bolts 92b to the frame 15. The support structure 91 is supported on a predetermined position, depending upon the size of the bags B being formed, and by any suitable means such as blocks 93 affixed as by bolts 93a to the frame 15 at one of the apertures 93b therein. The block 93 carries a cushioning spring 93c, the upper end of which supports the structure 91 and retains the supporting structure in the desired position.

The apparatus 90 has a plurality of elongate bag-cradling rollers 94a, 94b and 94c normally underlying the downward path of movement of the bags B and the length L of film material moving downwardly from station 24. Roller 94a is journalled on a rigid arm portion 91c of the supporting structure, and rollers 94b and 94c are journalled on downwardly swingable end brackets 95 pivotally connected to the arms 91c at 95a. An operating linkage 96 is connected to the end plates 95 to control the downward swinging of the rollers 94b and 94c. An operating bar 96a is operated by cam 96b, which is connected to motor 20 for swinging the linkage 96 and permitting downward swinging of rollers 94b and 94c at the proper time in the operating cycle of the machine so as to tip the bags B off the rollers after the bags have been sealed and severed at their upper end.

The apparatus 90 also includes a pair of bag-shaping rollers 97 journalled in slots 98a in end plates 98 which are affixed to the supporting structure 91. The axles of the rollers 97 are interconnected to the end plates 98 by springs 97a so as to continuously draw the rollers 97 toward each other. As the length L of tubular film material moves downwardly, after having been filled with a quantity of flowable or granular material, the filled length of film material passes between the rollers 97 which effectively squeeze the material in the tubular film material so as reshape it and flatten the bag into the desired, generally oval typical shape of a bag. It will be noted that a plurality of slots 98a are provided in each of the end plates so that the rollers 97 may be lowered or raised in relation to the position of the support rollers 94a, 94b, and 94c so that bags of various sizes can be efficiently handled.

The operation of the mechanism and the method carried out in this particular embodiment may be readily understood with reference to FIG. 12.

It is presumed that the mechanism has been operating in a series of operating cycles, and it is also presumed for purposes of description that the operating cycle commences with the inward movement of the piercing and slitting blade 35 and the filling spout 37. In FIG. 12, reference is made with respect to the several functions identified, to the cams and mechanisms for performing the various functions. It is also presumed, at the start of the cycle as described, that the slides 64 and 65 are cooperatively gripping the tubular film material at the zone 27 with the filled bag B still connected and being supported on the rollers 94a, 94b, and 94c.

Immediately after cam 37b swings the slitting blade 35 and spout 37 into the film material, the plate or paddle 51 is moved inwardly so as to swing the bulging ring 42 outwardly so that the entire open lower end of the spout 37 is in communicating relation with the interior of the tubular film. Immediately after the spout 37 has been properly positioned, the granular material is supplied into the portion of the length L of tubular material which is above the station 24. While the upper portion of the length L of tubular material is being filled with the flowable or granular material, cooling fluid is being supplied through the tubes 81 and 82 to cool the seals 28 and 29 previously formed.

When almost all of the desired quantity of flowable material has been supplied into the tubular film, the cam 74b quickly operates the severing knives 69 and 70 so as to physically detach the sealed and filled bag B from the upper portion of the length L of tubular material, and as to dispose of the short length of film material between the cuts produced at 26 and 26a.

When all of the flowable or granular material has been supplied into the length L of tubular film, cam 37b effects outward swinging of the spout 37 and blades 35 and substantially simultaneously therewith the cam 64c commences movement of the slides 64 and 65 so as to release their grip upon the film material.

Substantially simultaneously with the release of the film by the slide 64 and 65, the cooling is stopped by operation of cam 83a operating valve 83.

Also substantially simultaneously with the release of the film by the slide 64 and 65, the cam 96b operates the tip off rollers 94b and 94c so as to eject the bag B which has just been severed and released.

As soon as the slides 64 and 65 are separated, the brake 19 is released and the clutch 18 is engaged as to supply an additional length of ribbon R over the rollers 16 and 17 and permit the length L of tubular film, which is carrying a quantity of the flowable or granular material, to move downwardly so that the recently formed slit 25 may move from station 23 to station 24. The rollers 60 move inwardly under influence of operating cam 62b to swing the arms 57 outwardly and flatten the portion of the tubular film which moves to station 24 so as to cooperate with the bumper bars 89 and the levers 88 in flattening and eliminating wrinkles in the film material at the zone 27 which is to be clamped between the slides 64 and 65. When the sensing mechanism 22 senses an indexing mark on the ribbon R, the brake 19 is set and the clutch 18 is released so as to stop the movement of the ribbon R, at which time the previously formed slit 25 has moved to the second station 24. The slides 64 and 65 are then moved toward each other to, firstly, squeeze the air out of the tubular film by action of bumper bars 89, and then tension the zone 27 of the film by action of the levers 88, and then clamp the opposite sides of the tubular film together by the clamping bars 68a, 68b, 84a and 84b. As soon as the clamping is completed, sealing heat is applied through operation of cam 79d closing switch 79c so as to energize the sealing bars. The sealing heat is applied for a predetermined period, after which the cam 79d removes sealing heat by opening switch 79c and immediately after the cooling is applied through action of cam 83a and valve 83.

It will be seen that the invention provides a new and improved method and apparatus to substantially simultaneously, and in one continuing operation, form bags which are already filled with material and seal the bags into closed condition so as to completely minimize handling of the bag material and flowable or granular material being supplied into the bags.

It will, of course, be understood that various changes may be made in the form, details, arrangement and proportions of the various parts without departing from the scope of the invention.

We claim:

1. In the art of producing bags from a substantially continuous ribbon of tubular film material and filling such bags with flowable material, the method steps consisting in suspending a portion of the ribbon and progressively moving indexed locations on the ribbon to and stopping at a first station and thence one bag length downwardly to a second station, distending the tubular ribbon and cutting through and transversely across one side of the ribbon at successive indexed locations and at said first station, producing displacement of both the confronting upper and lower edges of the cut in the distended ribbon respectively inwardly and outwardly whereby to facilitate ready and easy supplying of the flowable material into the ribbon, clamping and securing the opposite sides of the ribbon together at said second station and at successive positions on the ribbon above said indexed locations to form bag bottoms, supplying the flowable material into the ribbon through the cut one side thereof at said first station after said clamping has been effected, and additionally cutting entirely across the tubular ribbon at said second station after said clamping and at successive indexed locations.

2. In the art of producing bags from a substantially continuous ribbon of tubular film material and filling such bags with flowable material, the method steps consisting in suspending a portion of the ribbon and progressively moving indexed locations on the ribbon to and stopping at a first station and thence one bag length downwardly to a second station, distending the tubular ribbon and cutting through and transversely across one side of the ribbon at successive indexed locations and at said first station, shaping of the ribbon into substantially flattened condition immediately adjacent and above the second station by bearing outwardly against the inner side of the ribbon and moving opposite portions of the ribbon transversely outwardly and away from each other, clamping and securing the opposite sides of the ribbon together at said second station and at successive positions on the ribbon above said indexed locations to form bag bottoms, supplying the flowable material into the ribbon through the cut one side thereof at said first station after said clamping has been effected, and additionally cutting entirely across the tubular ribbon at said second station after said clamping and at successive indexed locations.

3. In the art of producing bags from a substantially continuous ribbon of tubular film material and filling such bags with flowable material, the method steps consisting in suspending a portion of the ribbon and progressively moving indexed locations on the ribbon to and stopping at a first station and thence one bag length downwardly to a second station, distending the tubular ribbon and cutting through and transversely across one side of the ribbon at successive indexed locations and at said first station, clamping and securing the opposite sides of the ribbon together at said second station and at successive positions on the ribbon above said indexed locations to form bag bottoms, shielding the inner surface of the ribbon against exposure to such flowable material and dust therefrom at said first station and thereabove and adjacent the successive indexed locations, and said securing of the opposite sides of the ribbon together being effected by heat sealing, supplying the flowable material into the ribbon through the cut one side thereof at said first station after said clamping has been effected, and additionally cutting entirely across the tubular ribbon at said second station after said clamping and at successive indexed locations.

4. Apparatus for producing bags from a ribbon of tubular film material and filling such bags with flowable material, comprising means supporting a depending end portion of the ribbon along a filling station and a bag forming station below the filling station, clamping and securing means at said forming station and closing the ribbon along a broad zone extending across the ribbon and including a clamping bar engaging the ribbon to effect the closure, means distending the tubular ribbon between the filling station and said supporting means and restricting collapse of the ribbon at said filling station to facilitate slipping of the ribbon and supplying of the flowable material into the ribbon, the distending means including a ribbon bulging element within the distended ribbon and movable outwardly at the filling station to bulge one side of the ribbon, means for producing a slit in one side of the ribbon above the bulging element, and means sensitive to inward deflection of the ribbon above the bulging element and producing outward movement of said bulging element whereby to reshape said slit into a large capacity filling opening.

5. Apparatus for producing bags from a ribbon of tubular film material and filling such bags with flowable material, comprising means supporting a depending end portion of the ribbon along a filling station and a bag forming station below the filling station, clamping and securing means at said forming station and closing the ribbon along a broad zone extending across the ribbon and including a clamping bar engaging the ribbon to effect the closure, said clamping and securing means also effecting heat sealing of the film material along said clamping bar and at said broad zone, means distending the tubular ribbon between the filling station and said supporting means and resisting collapse of the ribbon at said filling station, means slitting the ribbon at the filling station and supplying the flowable material into the ribbon through the slit produced, and a dust-confining shroud of flexible sheet material within the ribbon at said filling station and lying against the inner surface of the ribbon to minimize accumulation of dust and other contaminants to heat sealing.

6. Apparatus for producing bags from a ribbon of tubular film material and filling such bags with flowable material, comprising means supporting a depending end portion of the ribbon along a filling station and a bag forming station below the filling station, clamping and securing means at said forming station and closing the ribbon along a broad zone extending across the ribbon and including a clamping bar engaging the ribbon to effect the closure, means distending the tubular ribbon between the filling station and said supporting means and resisting collapse of the ribbon at said filling station to facilitate slitting of the ribbon and supplying of the flowable material into the ribbon, a pair of elongate arms suspended within the ribbon and extending downwardly toward said forming station, and means moving the lower ends of the arms outwardly in opposite directions and against the ribbon to flatten the ribbon adjacent said forming station for lying smoothly against the bar for clamping and securing.

7. The bag producing apparatus according to claim 5 wherein said dust confining shroud has a closed top adjacent the distending means and thereby preventing upward migration of dust into the tubular ribbon of film material.

8. The bag producing apparatus according to claim 5 and including a pair of rigid arms extending within and downwardly from the shroud and urging the bag transversely outwardly into a flattened condition adjacent the clamping bar.

References Cited

UNITED STATES PATENTS

| | | | |
|---|---|---|---|
| 2,145,941 | 2/1939 | Maxfield | 53—28 |
| 2,861,406 | 11/1958 | Holsman et al. | 53—29 |
| 3,269,087 | 8/1966 | Cloud et al. | 53—29 |
| 3,334,466 | 8/1967 | Scholle | 53—28 |

THERON E. CONDON, Primary Examiner

E. F. DESMOND, Assistant Examiner

U.S. Cl. X.R.

53—183